United States Patent
Forest (10) Patent No.: US 9,624,454 B2
(45) Date of Patent: Apr. 18, 2017

(54) RECLAMATION OF ESTOLIDE BASE OILS FROM COMPOSITIONS COMPRISING IMMISCIBLE COMPONENTS

(71) Applicant: BIOSYNTHETIC TECHNOLOGIES, LLC., Irvine, CA (US)

(72) Inventor: Jeremy Forest, Honolulu, HI (US)

(73) Assignee: Biosynthetic Technologies, LLC, Irvine, CA (US)

( * ) Notice: Subject to any disclaimer, the term of this patent is extended or adjusted under 35 U.S.C. 154(b) by 0 days.

(21) Appl. No.: 14/852,301

(22) Filed: Sep. 11, 2015

(65) Prior Publication Data

US 2016/0090547 A1    Mar. 31, 2016

Related U.S. Application Data (60) Provisional application No. 62/055,627, filed on Sep. 25, 2014.

(51) Int. Cl.

| | | |
|---|---|---|
| *C11B 13/00* | (2006.01) | |
| *C11B 3/00* | (2006.01) | |
| *C10M 175/00* | (2006.01) | |
| *B01D 17/04* | (2006.01) | |

(52) U.S. Cl.
CPC ............ *C11B 13/00* (2013.01); *B01D 17/045* (2013.01); *C10M 175/005* (2013.01); *C11B 3/00* (2013.01)

(58) Field of Classification Search
None
See application file for complete search history.

(56) References Cited

U.S. PATENT DOCUMENTS

| | | | | |
|---|---|---|---|---|
| 3,800,944 A | * | 4/1974 | Yost .................... | B01D 17/045 210/693 |
| 3,960,719 A | * | 6/1976 | Bresson .............. | B01D 17/045 210/508 |
| 4,022,596 A | * | 5/1977 | Pedersen ............. | B01D 39/083 139/408 |
| 4,061,573 A | * | 12/1977 | Biron ................. | B01D 17/0202 210/282 |
| 4,212,733 A | | 7/1980 | Goto et al. | |
| 4,802,978 A | * | 2/1989 | Schmit .................. | B01D 17/00 210/104 |
| 5,401,404 A | * | 3/1995 | Strauss .............. | B01D 17/0208 210/252 |

(Continued)

FOREIGN PATENT DOCUMENTS

| | | | | |
|---|---|---|---|---|
| CA | 2642031 | * | 4/2010 | ........... B01D 17/025 |

OTHER PUBLICATIONS

Jain, A.K., et al., Capability of Biolubricants as alternative lubricant in industrial and maintenance applications, 2013, International Journal of Current Engineering and Technology, vol. 3, No. 1, pp. 179-183.*

(Continued)

*Primary Examiner* — Yate K Cutliff
(74) *Attorney, Agent, or Firm* — Jeremy Forest (57) ABSTRACT

Methods and systems for processing a composition comprising an estolide base oil and an immiscible component. In certain embodiments, the process comprises separating an estolide base oil from immiscible components such as water. In certain embodiments, the method comprises one or more of gravity separating, coalescing, and accumulating.

19 Claims, 5 Drawing Sheets

(56) References Cited

U.S. PATENT DOCUMENTS

| | | | | |
|---|---|---|---|---|
| 6,018,063 A | * | 1/2000 | Isbell | C10M 101/04 508/460 |
| 6,129,839 A | * | 10/2000 | Mains, Jr. | B01D 17/0205 210/188 |
| 6,641,738 B2 | * | 11/2003 | Hard | B01D 17/045 210/196 |
| 7,678,286 B2 | * | 3/2010 | Pays | B01D 17/0211 210/521 |
| 8,192,627 B2 | | 6/2012 | Gallop et al. | |
| 8,329,041 B2 | | 12/2012 | Joensen | |
| 8,450,256 B2 | | 5/2013 | Bredsguard | |
| 8,486,875 B2 | | 7/2013 | Bredsguard | |
| 2005/0040106 A1 | * | 2/2005 | Gigas | B01D 11/0453 210/634 |
| 2013/0270187 A1 | | 10/2013 | Seibert et al. | |

OTHER PUBLICATIONS

Emsbo-Mattingly, S., Hydrocarbon compositoin of vessel discharges: Potential sources of petroleum in coastal environments, 2005, Remediation Provessional, 7 pages.*

Ivanenko, et al., "Simulation of the Separation of Emulsified Oil Products from Water in an Apparatus with SinusoidalProfiled Oleophilic Plates", St. Petersburg State Technological Institute, Moskovskii pr. 26, St. Petersburg, 190013 Russia.

* cited by examiner

RECLAMATION OF ESTOLIDE BASE OILS FROM COMPOSITIONS COMPRISING IMMISCIBLE COMPONENTS

FIELD

The present disclosure relates to methods and systems for processing a composition comprising an estolide base oil and an immiscible component.

BACKGROUND

Concern over the environmental quality of the world's oceans and waterways continues to grow. In light of that, industry has taken steps to implement the use of environmentally-friendly chemicals and lubricants. Nevertheless, steps should still be taken to ensure that these products are not inadvertently dispersed in the environment and, if they are, appropriate reclamation methods should be implemented. Still to this day, many industrial manufacturers dispose of waste chemicals and lubricating products into sewers and storm drains. Like the bilge water that accumulates within a ship's hull, these land-based operations often produce large quantities of water contaminated with oil, fuel, and other hydrocarbon-based waste.

Similarly, it is still common practice within the maritime industry to dump polluted bilge water overboard. While many countries attempt to protect against such practices by the threat of criminal penalties and fines amounting to millions of dollars, such deterrence measures are difficult to enforce and are often easily avoided by operators who travel in and out of regulated waters. Unfortunately, pumping polluted water overboard is simpler and less expensive than either cleaning the water prior to pumping it overboard or holding the polluted water until arriving in port where it can be pumped to a land-based water treatment facility.

Maritime, automotive, and other commercial industries have begun to formulate environmentally-friendly chemicals and lubricants containing estolide base oils. Estolides are bio-based, non-toxic, biodegradable, and non-bioaccumulative. Nevertheless, estolides can find their way into the environment in the same manner that their petroleum-based counterparts do. Accordingly, there remains a need to develop methods of reclaiming estolides for reuse and/or recycling.

SUMMARY

Described herein are systems and methods for separating components of a composition, comprising providing a composition comprising an estolide base oil and at least one immiscible component, and separating the at least one immiscible component and the estolide base oil. In certain embodiments, the at least one immiscible component comprises water. In certain embodiments, the composition comprises an emulsion. In certain embodiments, the separating comprises at least one of gravity separating, coalescing, or accumulating.

Also described are systems for separating estolide base oils and immiscible components. In certain embodiments, the system comprises at least one of a gravity separator, a coalescer, or an accumulator. In certain embodiments, the system comprises a coalescer comprising an oleophilic material and a composition, wherein said composition comprises an estolide ase oil and an immiscible component.

DETAILED DESCRIPTION

The methods described herein comprise the separation of estolide base oils and immiscible components. In certain embodiments, the method may be implemented to reclaim estolide base oils from compositions such as marine bilge water, industrial manufacturing and waste streams, and oil field or drilling fluids. In certain embodiments the waste stream may comprise used motor oil.

As used in the present specification, the following words, phrases and symbols are generally intended to have the meanings as set forth below, except to the extent that the context in which they are used indicates otherwise. The following abbreviations and terms have the indicated meanings throughout:

A dash ("-") that is not between two letters or symbols is used to indicate a point of attachment for a substituent. For example, —C(O)NH$_2$ is attached through the carbon atom.

"Alkoxy" by itself or as part of another substituent refers to a radical —OR$^{31}$ where R$^{31}$ is alkyl, cycloalkyl, cycloalkylalkyl, aryl, or arylalkyl, which can be substituted, as defined herein. In some embodiments, alkoxy groups have from 1 to 8 carbon atoms. In some embodiments, alkoxy groups have 1, 2, 3, 4, 5, 6, 7, or 8 carbon atoms. Examples of alkoxy groups include, but are not limited to, methoxy, ethoxy, propoxy, butoxy, cyclohexyloxy, and the like.

"Alkyl" by itself or as part of another substituent refers to a saturated or unsaturated, branched, or straight-chain monovalent hydrocarbon radical derived by the removal of one hydrogen atom from a single carbon atom of a parent alkane, alkene, or alkyne. Examples of alkyl groups include, but are not limited to, methyl; ethyls such as ethanyl, ethenyl, and ethynyl; propyls such as propan-1-yl, propan-2-yl, prop-1-en-1-yl, prop-1-en-2-yl, prop-2-en-1-yl (allyl), prop-1-yn-1-yl, prop-2-yn-1-yl, etc.; butyls such as butan-1-yl, butan-2-yl, 2-methyl-propan-1-yl, 2-methyl-propan-2-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, but-1-yn-1-yl, but-1-yn-3-yl, but-3-yn-1-yl, etc.; and the like.

Unless otherwise indicated, the term "alkyl" is specifically intended to include groups having any degree or level of saturation, i.e., groups having exclusively single carbon-carbon bonds, groups having one or more double carbon-carbon bonds, groups having one or more triple carbon-carbon bonds, and groups having mixtures of single, double, and triple carbon-carbon bonds. Where a specific level of saturation is intended, the terms "alkanyl," "alkenyl," and "alkynyl" are used. In certain embodiments, an alkyl group comprises from 1 to 40 carbon atoms, in certain embodiments, from 1 to 22 or 1 to 18 carbon atoms, in certain embodiments, from 1 to 16 or 1 to 8 carbon atoms, and in certain embodiments from 1 to 6 or 1 to 3 carbon atoms. In certain embodiments, an alkyl group comprises from 8 to 22 carbon atoms, in certain embodiments, from 8 to 18 or 8 to 16. In some embodiments, the alkyl group comprises from 3 to 20 or 7 to 17 carbons. In some embodiments, the alkyl group comprises 1, 2, 3, 4, 5, 6, 7, 8, 9, 10, 11, 12, 13, 14, 15, 16, 17, 18, 19, 20, 21, or 22 carbon atoms.

"Aryl" by itself or as part of another substituent refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes 5- and 6-membered carbocyclic aromatic rings fused to a 5- to 7-membered non-aromatic heterocycloalkyl ring containing one or more heteroatoms chosen from N, O, and S. For such fused, bicyclic ring systems wherein only one of the rings is a carbocyclic aromatic ring, the point of attachment may be at the carbocyclic aromatic ring or the heterocycloalkyl ring. Examples of aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, an aryl group can comprise from 5 to 20 carbon atoms, and in certain embodiments, from 5 to 12 carbon atoms. In certain embodiments, an aryl group can comprise 5, 6, 7, 8, 9, 10, 11, 12, 13, 14, 15, 16, 17, 18, 19, or 20 carbon atoms. Aryl, however, does not encompass or overlap in any way with heteroaryl, separately defined herein. Hence, a multiple ring system in which one or more carbocyclic aromatic rings is fused to a heterocycloalkyl aromatic ring, is heteroaryl, not aryl, as defined herein.

"Arylalkyl" by itself or as part of another substituent refers to an acyclic alkyl radical in which one of the hydrogen atoms bonded to a carbon atom, typically a terminal or $sp^3$ carbon atom, is replaced with an aryl group. Examples of arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthohenzyl, 2-naphthophenylethan-1-yl, and the like. Where specific alkyl moieties are intended, the nomenclature arylalkanyl, arylalkenyl, or arylalkynyl is used. In certain embodiments, an arylalkyl group is $C_{7-30}$ arylalkyl, e.g., the alkanyl, alkenyl, or alkynyl moiety of the arylalkyl group is $C_{1-10}$ and the aryl moiety is $C_{6-20}$, and in certain embodiments, an arylalkyl group is $C_{7-20}$ arylalkyl, e.g., the alkanyl, alkenyl, or alkynyl moiety of the arylalkyl group is $C_{1-8}$ and the aryl moiety is $C_{6-12}$.

"Estolide" as used herein may generally refer to a certain oligomeric/polymeric compounds comprising at least one carboxylic group bound to the hydrocarbon backbone (i.e., alkyl residue) of at least one second carboxylic group. Estolides may be naturally occurring or synthetically derived. Exemplary synthetic estolides include, but are not limited to, oligomeric/polymeric compounds comprising two or more fatty acid residues, which may be formed by the addition of one fatty acid to the hydrocarbon backbone of a second fatty acid residue via an addition reaction across a site of unsaturation, or a condensation reaction with a hydroxyl group. Naturally occurring estolides may include esto-glyceride type compounds (e.g., triacylglycerol estolides), such as those found in certain hydroxy-containing triglycerides of the genus *lesquerella, mallotus,* or *trewia*. Per this definition, the triesters described herein comprising terminal vicinal acyl groups may be considered estolides. However, unless specified to the contrary, any reference herein to the term "estolide" shall not encompass the triesters comprising terminal vicinal acyl groups described herein.

"Compounds" refers to compounds encompassed by structural Formula I and II herein and includes any specific compounds within the formula whose structure is disclosed herein. Compounds may be identified either by their chemical structure and/or chemical name. When the chemical structure and chemical name conflict, the chemical structure is determinative of the identity of the compound. The compounds described herein may contain one or more chiral centers and/or double bonds and therefore may exist as stereoisomers such as double-bond isomers (i.e., geometric isomers), enantiomers, or diastereomers. Accordingly, any chemical structures within the scope of the specification depicted, in whole or in part, with a relative configuration encompass all possible enantiomers and stereoisomers of the illustrated compounds including the stereoisomerically pure form (e.g., geometrically pure, enantiomerically pure, or diastereomerically pure) and enantiomeric and stereoisomeric mixtures. Enantiomeric and stereoisomeric mixtures may be resolved into their component enantiomers or stereoisomers using separation techniques or chiral synthesis techniques well known to the skilled artisan.

For the purposes of the present disclosure, "chiral compounds" are compounds having at least one center of chirality (i.e. at least one asymmetric atom, in particular at least one asymmetric C atom), having an axis of chirality, a plane of chirality or a screw structure. "Achiral compounds" are compounds which are not chiral.

Compounds of Formula I and II include, but are not limited to, optical isomers of compounds of Formula I and II, racemates thereof, and other mixtures thereof. In such embodiments, the single enantiomers or diastereomers, i.e., optically active forms, can be obtained by asymmetric synthesis or by resolution of the racemates. Resolution of the racemates may be accomplished by, for example, chromatography, using, for example a chiral high-pressure liquid chromatography (HPLC) column. However, unless otherwise stated, it should be assumed that Formula I and II cover all asymmetric variants of the compounds described herein, including isomers, racemates, enantiomers, diastereomers, and other mixtures thereof. In addition, compounds of Formula I and II include Z- and E-forms (e.g., cis- and trans-forms) of compounds with double bonds. The compounds of Formula I and II may also exist in several tautomeric forms including the enol form, the keto form, and mixtures thereof. Accordingly, the chemical structures depicted herein encompass all possible tautomeric forms of the illustrated compounds.

"Cycloalkyl" by itself or as part of another substituent refers to a saturated or unsaturated cyclic alkyl radical. Where a specific level of saturation is intended, the nomenclature "cycloalkanyl" or "cycloalkenyl" is used. Examples of cycloalkyl groups include, but are not limited to, groups derived from cyclopropane, cyclobutane, cyclopentane, cyclohexane, and the like. In certain embodiments, a cycloalkyl group is $C_{3-15}$ cycloalkyl, and in certain embodiments, $C_{3-12}$ cycloalkyl or $C_{5-12}$ cycloalkyl. In certain embodiments, a cycloalkyl group is a $C_5$, $C_6$, $C_7$, $C_8$, $C_9$, $C_{10}$, $C_{11}$, $C_{12}$, $C_{13}$, $C_{14}$, or $C_{15}$ cycloalkyl.

"Cycloalkylalkyl" by itself or as part of another substituent refers to an acyclic alkyl radical in which one of the hydrogen atoms bonded to a carbon atom, typically a terminal or sp³ carbon atom, is replaced with a cycloalkyl group. Where specific alkyl moieties are intended, the nomenclature cycloalkylalkanyl, cycloalkylalkenyl, or cycloalkylalkynyl is used. In certain embodiments, a cycloalkylalkyl group is $C_{7-30}$ cycloalkylalkyl, e.g., the alkanyl, alkenyl, or alkynyl moiety of the cycloalkylalkyl group is $C_{1-10}$ and the cycloalkyl moiety is $C_{6-20}$, and in certain embodiments, a cycloalkylalkyl group is $C_{7-20}$ cycloalkylalkyl, e.g., the alkanyl, alkenyl, or alkynyl moiety of the cycloalkylalkyl group is $C_{1-8}$ and the cycloalkyl moiety is $C_{4-20}$ or $C_{6-12}$.

"Halogen" refers to a fluoro, chloro, bromo, or iodo group.

"Heteroaryl" by itself or as part of another substituent refers to a monovalent heteroaromatic radical derived by the removal of one hydrogen atom from a single atom of a parent heteroaromatic ring system. Heteroaryl encompasses multiple ring systems having at least one aromatic ring fused to at least one other ring, which can be aromatic or non-aromatic in which at least one ring atom is a heteroatom. Heteroaryl encompasses 5- to 12-membered aromatic, such as 5- to 7-membered, monocyclic rings containing one or more, for example, from 1 to 4, or in certain embodiments, from 1 to 3, heteroatoms chosen from N, O, and S, with the remaining ring atoms being carbon; and bicyclic heterocycloalkyl rings containing one or more, for example, from 1 to 4, or in certain embodiments, from 1 to 3, heteroatoms chosen from N, O, and S, with the remaining ring atoms being carbon and wherein at least one heteroatom is present in an aromatic ring. For example, heteroaryl includes a 5- to 7-membered heterocycloalkyl, aromatic ring fused to a 5- to 7-membered cycloalkyl ring. For such fused, bicyclic heteroaryl ring systems wherein only one of the rings contains one or more heteroatoms, the point of attachment may be at the heteroaromatic ring or the cycloalkyl ring. In certain embodiments, when the total number of N, S, and O atoms in the heteroaryl group exceeds one, the heteroatoms are not adjacent to one another. In certain embodiments, the total number of N, S, and O atoms in the heteroaryl group is not more than two. In certain embodiments, the total number of N, S, and O atoms in the aromatic heterocycle is not more than one. Heteroaryl does not encompass or overlap with aryl as defined herein.

Examples of heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain embodiments, a heteroaryl group is from 5- to 20-membered heteroaryl, and in certain embodiments from 5- to 12-membered heteroaryl or from 5- to 10-membered heteroaryl. In certain embodiments, a heteroaryl group is a 5-, 6-, 7-, 8-, 9-, 10-, 11-, 12-, 13-, 14-, 15-, 16-, 17-, 18-, 19-, or 20-membered heteroaryl. In certain embodiments heteroaryl groups are those derived from thiophene, pyrrole, benzothiophene, benzofuran, indole, pyridine, quinoline, imidazole, oxazole, and pyrazine.

"Heteroarylalkyl" by itself or as part of another substituent refers to an acyclic alkyl radical in which one of the hydrogen atoms bonded to a carbon atom, typically a terminal or sp³ carbon atom, is replaced with a heteroaryl group. Where specific alkyl moieties are intended, the nomenclature heteroarylalkanyl, heteroarylalkenyl, or heteroarylalkynyl is used. In certain embodiments, a heteroarylalkyl group is a 6- to 30-membered heteroarylalkyl, e.g., the alkanyl, alkenyl, or alkynyl moiety of the heteroarylalkyl is 1- to 10-membered and the heteroaryl moiety is a 5- to 20-membered heteroaryl, and in certain embodiments, 6- to 20-membered heteroarylalkyl, e.g., the alkanyl, alkenyl, or alkynyl moiety of the heteroarylalkyl is 1- to 8-membered and the heteroaryl moiety is a 5- to 12-membered heteroaryl.

"Heterocycloalkyl" by itself or as part of another substituent refers to a partially saturated or unsaturated cyclic alkyl radical in which one or more carbon atoms (and any associated hydrogen atoms) are independently replaced with the same or different heteroatom. Examples of heteroatoms to replace the carbon atom(s) include, but are not limited to, N, P, O, S, Si, etc. Where a specific level of saturation is intended, the nomenclature "heterocycloalkanyl" or "heterocycloalkenyl" is used. Examples of heterocycloalkyl groups include, but are not limited to, groups derived from epoxides, azirines, thiiranes, imidazolidine, morpholine, piperazine, piperidine, pyrazolidine, pyrrolidine, quinuclidine, and the like.

"Heterocycloalkylalkyl" by itself or as part of another substituent refers to an acyclic alkyl radical in which one of the hydrogen atoms bonded to a carbon atom, typically a terminal or sp³ carbon atom, is replaced with a heterocycloalkyl group. Where specific alkyl moieties are intended, the nomenclature heterocycloalkylalkanyl, heterocycloalkylalkenyl, or heterocycloalkylalkynyl is used. In certain embodiments, a heterocycloalkylalkyl group is a 6- to 30-membered heterocycloalkylalkyl, e.g., the alkanyl, alkenyl, or alkynyl moiety of the heterocycloalkylalkyl is 1- to 10-membered and the heterocycloalkyl moiety is a 5- to 20-membered heterocycloalkyl, and in certain embodiments, 6- to 20-membered heterocycloalkylalkyl, e.g., the alkanyl, alkenyl, or alkynyl moiety of the heterocycloalkylalkyl is 1- to 8-membered and the heterocycloalkyl moiety is a 5- to 12-membered heterocycloalkyl.

"Mixture" refers to a collection of molecules or chemical substances. Each component in a mixture can be independently varied. A mixture may contain, or consist essentially of, two or more substances intermingled with or without a constant percentage composition, wherein each component may or may not retain its essential original properties, and where molecular phase mixing may or may not occur. In mixtures, the components making up the mixture may or may not remain distinguishable from each other by virtue of their chemical structure.

"Parent aromatic ring system" refers to an unsaturated cyclic or polycyclic ring system having a conjugated π (pi) electron system. Included within the definition of "parent aromatic ring system" are fused ring systems in which one or more of the rings are aromatic and one or more of the rings are saturated or unsaturated, such as, for example, fluorene, indane, indene, phenalene, etc. Examples of parent aromatic ring systems include, but are not limited to, aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like.

"Parent heteroaromatic ring system" refers to a parent aromatic ring system in which one or more carbon atoms (and any associated hydrogen atoms) are independently replaced with the same or different heteroatom. Examples of heteroatoms to replace the carbon atoms include, but are not limited to, N, P, O, S, Si, etc. Specifically included within the definition of "parent heteroaromatic ring systems" are fused ring systems in which one or more of the rings are aromatic and one or more of the rings are saturated or unsaturated, such as, for example, arsindole, benzodioxan, benzofuran, chromane, chromene, indole, indoline, xanthene, etc. Examples of parent heteroaromatic ring systems include, but are not limited to, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like.

"Substituted" refers to a group in which one or more hydrogen atoms are independently replaced with the same or different substituent(s). Examples of substituents include, but are not limited to, $-R^{64}$, $-R^{60}$, $-O^-$, $-OH$, $=O$, $-OR^{60}$, $-SR^{60}$, $-S^-$, $=S$, $-NR^{60}R^{61}$, $=NR^{60}$, $-CN$, $-CF_3$, $-OCN$, $-SCN$, $-NO$, $-NO_2$, $=N_2$, $-N_3$, $-S(O)_2O^-$, $-S(O)_2OH$, $-S(O)_2R^{60}$, $-OS(O_2)O^-$, $-OS(O)_2R^{60}$, $-P(O)(O^-)_2$, $-P(O)(OR^{60})(O^-)$, $-OP(O)(OR^{60})(OR^{61})$, $-C(O)R^{60}$, $-C(S)R^{60}$, $-C(O)OR^{60}$, $-C(O)NR^{60}R^{61}$, $-C(O)O^-$, $-C(S)OR^{60}$, $-NR^{62}C(O)NR^{60}R^{61}$, $-NR^{62}C(S)NR^{60}R^{61}$, $-NR^{62}C(NR^{63})NR^{60}R^{61}$, $-C(NR^{62})NR^{60}R^{61}$, $-S(O)_2$, $NR^{60}R^{61}$, $-NR^{63}S(O)_2R^{60}$, $-NR^{63}C(O)R^{60}$, and $-S(O)R^{60}$;

wherein each $-R^{64}$ is independently a halogen; each $R^{60}$ and $R^{61}$ are independently alkyl, substituted alkyl, alkoxy, substituted alkoxy, cycloalkyl, substituted cycloalkyl, heterocycloalkyl, substituted heterocycloalkyl, aryl, substituted aryl, heteroaryl, substituted heteroaryl, arylalkyl, substituted arylalkyl, heteroarylalkyl, or substituted heteroarylalkyl, or $R^{60}$ and $R^{61}$ together with the nitrogen atom to which they are bonded form a heterocycloalkyl, substituted heterocycloalkyl, heteroaryl, or substituted heteroaryl ring, and $R^{62}$ and $R^{63}$ are independently alkyl, substituted alkyl, aryl, substituted aryl, arylalkyl, substituted arylalkyl, cycloalkyl, substituted cycloalkyl, heterocycloalkyl, substituted heterocycloalkyl, heteroaryl, substituted heteroaryl, heteroarylalkyl, or substituted heteroarylalkyl, or $R^{62}$ and $R^{63}$ together with the atom to which they are bonded form one or more heterocycloalkyl, substituted heterocycloalkyl, heteroaryl, or substituted heteroaryl rings;

wherein the "substituted" substituents, as defined above for $R^{60}$, $R^{61}$, $R^{62}$, and $R^{63}$, are substituted with one or more, such as one, two, or three, groups independently selected from alkyl, -alkyl-OH, $-O$-haloalkyl, -alkyl-$NH_2$, alkoxy, cycloalkyl, cycloalkylalkyl, heterocycloalkyl, heterocycloalkylalkyl, aryl, heteroaryl, arylalkyl, heteroarylalkyl, $-O^-$, $-OH$, $=O$, $-O$-alkyl, $-O$-aryl, $-O$-heteroarylalkyl, $-O$-cycloalkyl, $-O$-heterocycloalkyl, $-SH$, $-S^-$, $=S$, $-S$-alkyl, $-S$-aryl, $-S-$ heteroarylalkyl, $-S$-cycloalkyl, $-S$-heterocycloalkyl, $-NH_2$, $=NH$, $-CN$, $-CF_3$, $-OCN$, $-SCN$, $-NO$, $-NO_2$, $=N_2$, $-N_3$, $-S(O)_2O^-$, $-S(O)_2$, $-S(O)_2OH$, $-OS(O_2)O^-$, $-SO_2$ (alkyl), $-SO_2$(phenyl), $-SO_2$(haloalkyl), $-SO_2NH_2$, $-SO_2NH$(alkyl), $-SO_2NH$(phenyl), $-P(O)(O^-)_2$, $-P(O)(O$-alkyl)($O^-$), $-OP(O)(O$-alkyl)($O$-alkyl), $-CO_2H$, $-C(O)O$(alkyl), $-CON$(alkyl)(alkyl), $-CONH$(alkyl), $-CONH_2$, $-C(O)$(alkyl), $-C(O)$(phenyl), $-C(O)$(haloalkyl), $-OC(O)$(alkyl), $-N$(alkyl)(alkyl), $-NH$(alkyl), $-N$(alkyl)(alkylphenyl), $-NH$(alkylphenyl), $-NHC(O)$(alkyl), $-NHC(O)$(phenyl), $-N$(alkyl)$C(O)$(alkyl), and $-N$(alkyl)$C(O)$(phenyl).

As used in this specification and the appended claims, the articles "a," "an," and "the" include plural referents unless expressly and unequivocally limited to one referent.

All numerical ranges herein include all numerical values and ranges of all numerical values within the recited range of numerical values.

Described herein are methods of separating components of a composition, comprising providing a composition comprising an estolide base oil and at least one immiscible component, and separating the at least one immiscible component and the estolide base oil. In certain embodiments, the at least one immiscible component comprises water. In certain embodiments, the composition comprises an emulsion. In certain embodiments, the separating comprises at least one of gravity separating, coalescing, or accumulating. In certain embodiments, the method may be implemented to reclaim estolide base oils from compositions such as marine bilge water, industrial manufacturing and waste streams, and oil field or drilling fluids.

In certain embodiments, the system for carrying out the methods described herein comprises at least one of a primary separator, an accumulator, or a coalescer. In certain embodiments, a pump may be implemented to draw the composition through at least the primary separator and coalescer. In certain embodiments, the system may comprise the use of multiple primary separators, accumulators, and/or coalescers, with or without the use of one or more pumps.

In certain embodiments, the primary separator comprises a gravity separator, such as an API separator. In certain embodiments, the separator comprises a housing having at least one inlet, at least one immiscible component outlet, and at least one estolide base oil outlet. In certain embodiments, the primary separator may simply comprise a housing that allows for the collection of the composition, such as oily bilge water. The primary separator may allow an initial separation of the estolide base oil and immiscible component(s) over a period of time by gravity separation. For example, gravity separation of an estolide base oil and water will allow at least a portion of the estolide base oil to rise to the top of the primary separator, providing for a layer of estolide base oil on top of the water layer. In certain embodiments, the primary separator may comprise multiple inlets and outlets in fluid communication with one or more additional units. An exemplary primary separator may comprise an inlet for introduction of the composition into the housing of the primary separator, and two outlets for the separate removal of the immiscible component(s) and the estolide base oil.

In certain embodiments, the system further comprises at least one coalescer. In certain embodiments, the coalescer is an independent structure comprising its own housing. In certain embodiments, the coalescer comprises at least one inlet, at least one immiscible component outlet, and at least one estolide base oil outlet. In certain embodiments, the coalescer comprises a coalescing structure, optionally disposed at an inclined angle. In certain embodiments, the inlet/base oil outlet are located at an upper end of the coalescer housing, while the immiscible component outlet is located at a lower end of the coalescer housing. In certain embodiments, the inlet of the coalescer is coupled to the at least one immiscible component outlet of the separator.

In certain embodiments, the coalescing structure comprises a plurality of plates. Exemplary plate structures may include sinusoidal (corrugated) plate designs. In certain embodiments, the plates are designed to maximize surface area to help estolide base oil droplets "coalesce" and form bigger drops that can be collected for accumulation. In certain embodiments, the coalescer comprises the use of an oleophilic material to "attract" estolide base oil droplets and improve collection and accumulation. This may be especially useful in circumstances when the composition comprises an emulsion, such as an estolide base oil/water emulsion (either water in oil, or oil in water-type emulsions). In certain embodiments, the oleophilic material may be provided on and/or in between the plates. In certain embodiments, the plates may be constructed of the oleophilic material. In an effort to further improve estolide base oil collection and accumulation, the oleophilic material may be formed into a matted or woven mesh. In certain embodiments, the oleophilic material comprises a polymer or copolymer. In certain embodiments, the oleophilic material comprises at least one of a polyolefin, a halogenated polymer, a paraffin wax, or a nylon. In certain embodiments, the oleophilic material comprises a copolymer comprising one or more of ethylene, propylene, pentene, and hexane. In certain embodiments, the oleophilic material comprises a polyfluorocarbon. In certain embodiments, the oleophilic material comprises one or more of polypropylene, polyethylene, polypentene, polyhexene, polyvinyl chloride, or polyethylene terephthalate.

In certain embodiments, the system may further comprise an air injection manifold. In certain embodiments, the air injection manifold may provide a cross-flow of air bubbles in the coalescer which aids in separating out smaller oil droplets that are not removed in the separator. In certain embodiments, the air injection manifold is in fluid communication with the separator (e.g., via the at least one immiscible component outlet) and the coalescer (e.g., via the at least one immiscible component inlet). As noted above, the coalescer may comprise a plurality of plates, which may form a corrugated plate structure. Accordingly, in certain embodiments, the injection of air into the coalescer will provide a sinuous flow path for the base oil/immiscible component composition to help effect the coalescing of oil droplets.

In certain embodiments, the accumulator comprises at least one estolide base oil inlet and at least one estolide base oil outlet. In certain embodiments, the accumulator and the primary separator are in fluid communication with each other. For example, in certain embodiments, the at least one base oil outlet of the primary separator is in fluid communication with the at least one base oil inlet of the accumulator. In certain embodiments, the accumulator may comprise multiple inlets and outlets. In certain embodiments, the accumulator is also in fluid communication with the coalescer, such that coalesced estolide base oil may be transferred to the accumulator via the estolide base oil outlet of said coalescer. In certain embodiments, the accumulator is simply a holding tank for estolide base oils that have been substantially separated from the immiscible component(s). The estolide base oils may be sourced from the accumulator for reuse and/or recycling.

In certain embodiments, the system may include multiple units, or one primary unit designed to implement one or more of the functions previously described herein. For example, in certain embodiments the system may comprise a separate primary separator unit and independent coalescer unit. However, in certain embodiments, the primary separator may include a coalescing structure within a single unit. For example, in certain embodiments the primary separator may include a gravity separation design that comprises one or more parallel plates to help effect the collection of estolide base oil droplets, thereby improving the separation of the estolide base oil and immiscible component(s).

In certain embodiments, the primary separator serves a "pre-filter" function to first remove solids and suspended particulate. The solids and particulate matter may be collected in the primary separator during the initial phase separation of the estolide base oil and immiscible component(s). In certain embodiments, a filtration device may be used to aid the separation of solids and particulates. After initial phase separation, the immiscible components may be flowed through a coalescer (e.g., parallel plate stack), which may be contained in the primary separator or a separate coalescer unit. The coalescer allows the estolide base oil to settle out and rise to the upper portion of the unit. In certain embodiments, due to the inclination of the parallel plate stack and the upward movement of composition through the plate stack, the separated base oil flows upward through the top portions of the plates to the estolide base oil outlet at the upper end of the unit, which is optionally flowed into an alternate unit (e.g., an accumulator). Optionally, the separator/coalescer may implement the use of an air manifold, which may provide a source of air pressure and bubbles to improve the coalescing and removal of estolide base oils from the immiscible components and parallel plates. In certain embodiments, immiscible components that have undergone pre-filtering and coalescing may undergo one or more additional coalescing steps to remove any residual estolide base oil that may be present. Subsequently, the purified immiscible component(s) (e.g., water) may be recycled and/or reused.

The following embodiments are exemplary only and should not be viewed as limiting the scope of the present disclosure.

Figure 1:
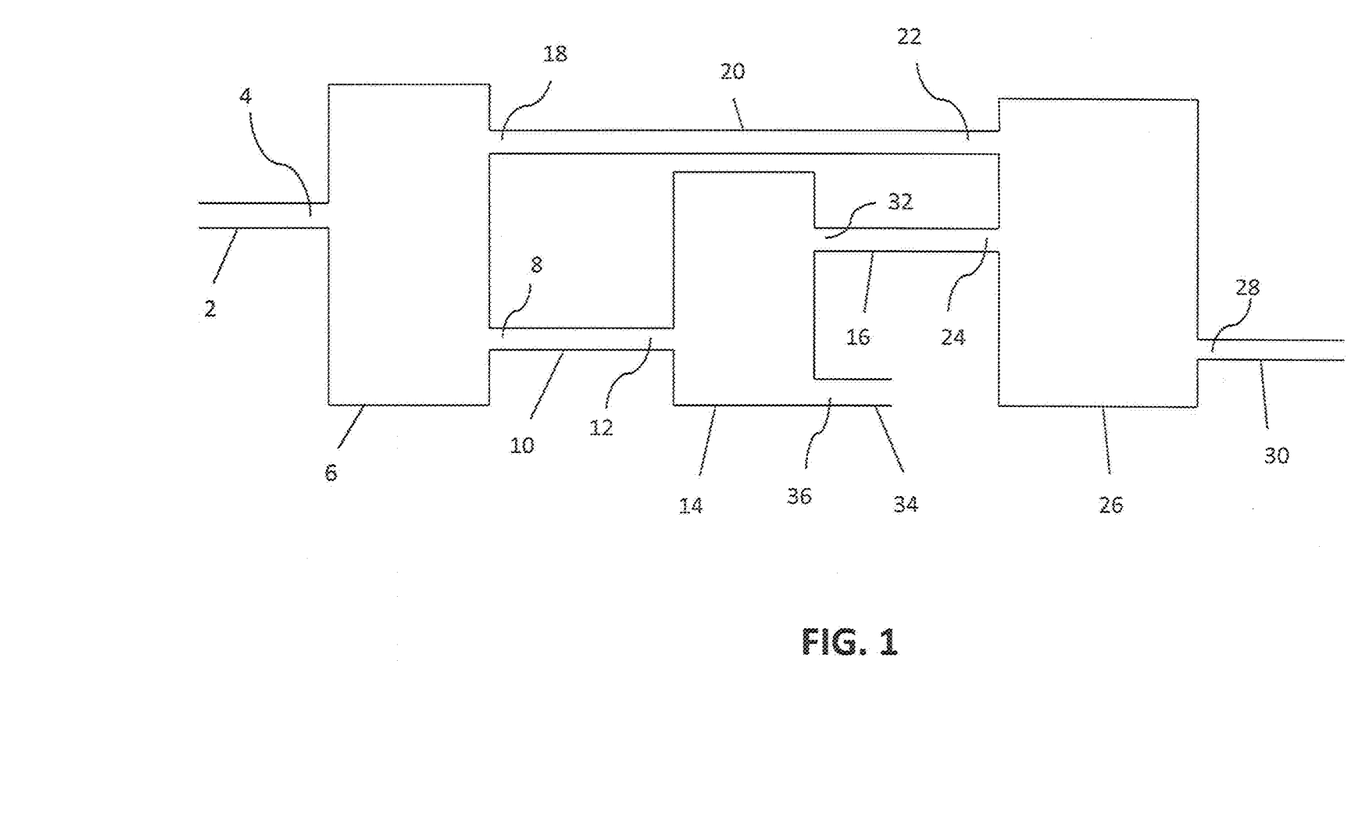
FIG. 1 is a cross section illustration of an exemplary reclamation system.
Figure 2:
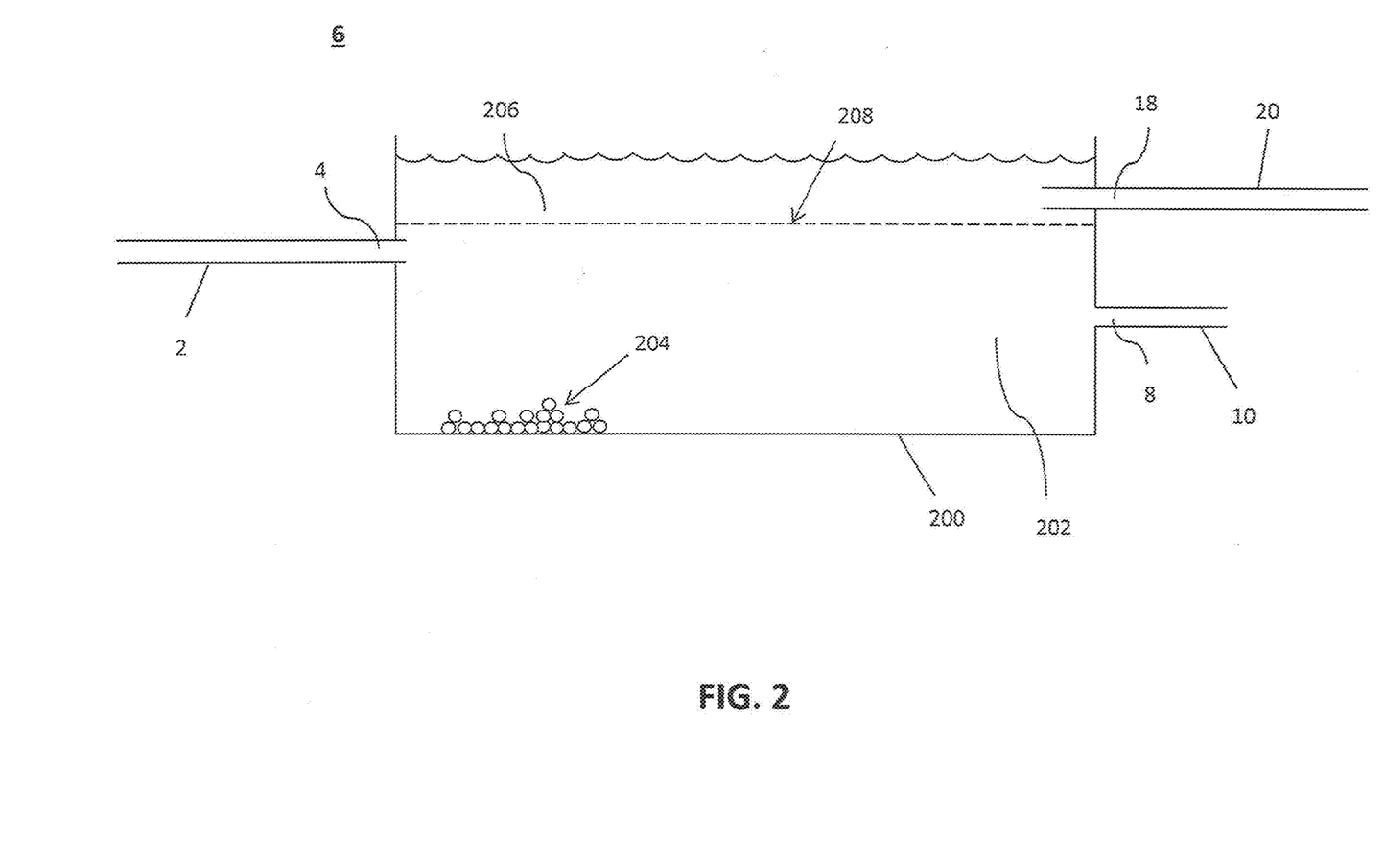
FIG. 2 is a cross section illustration of an exemplary primary separator.

FIG. 1 provides a cross-sectional view of an exemplary estolide base oil reclamation system. Included are primary separator 6, coalescer 14, and accumulator 26, all of which are in fluid communication. The composition comprising the estolide base oil and at least one immiscible component may be flowed into primary separator 6 via conduit 2 and inlet 4. As shown in FIG. 2, primary separator 6 may be a gravity separator, whereby phase separation of the estolide base oil and at least one immiscible component allows for formation of estolide base oil layer 206 towards the top of primary separator 6, creating interface 208 with immiscible component layer 202. Phase separation in primary separator 6 may also allow for the removal of solids/particulates 204 at the bottom of separator housing 200. Solids/particulates 204 can be physically or mechanically removed from primary separator 6, while estolide base oil layer 206 can be removed through conduit 20 via outlet 18. Immiscible component layer 202 may be removed through conduit 10 via outlet 8. Estolide base oil layer 206 may be shuttled to directly to accumulator 26 through conduit 20 via inlet 22, or another independent storage unit (e.g., waste holding). Immiscible component layer 202 may be shuttled directly to coalescer 14 through conduit 10 via inlet 12, or to another independent purification or storage site.

Figure 3:
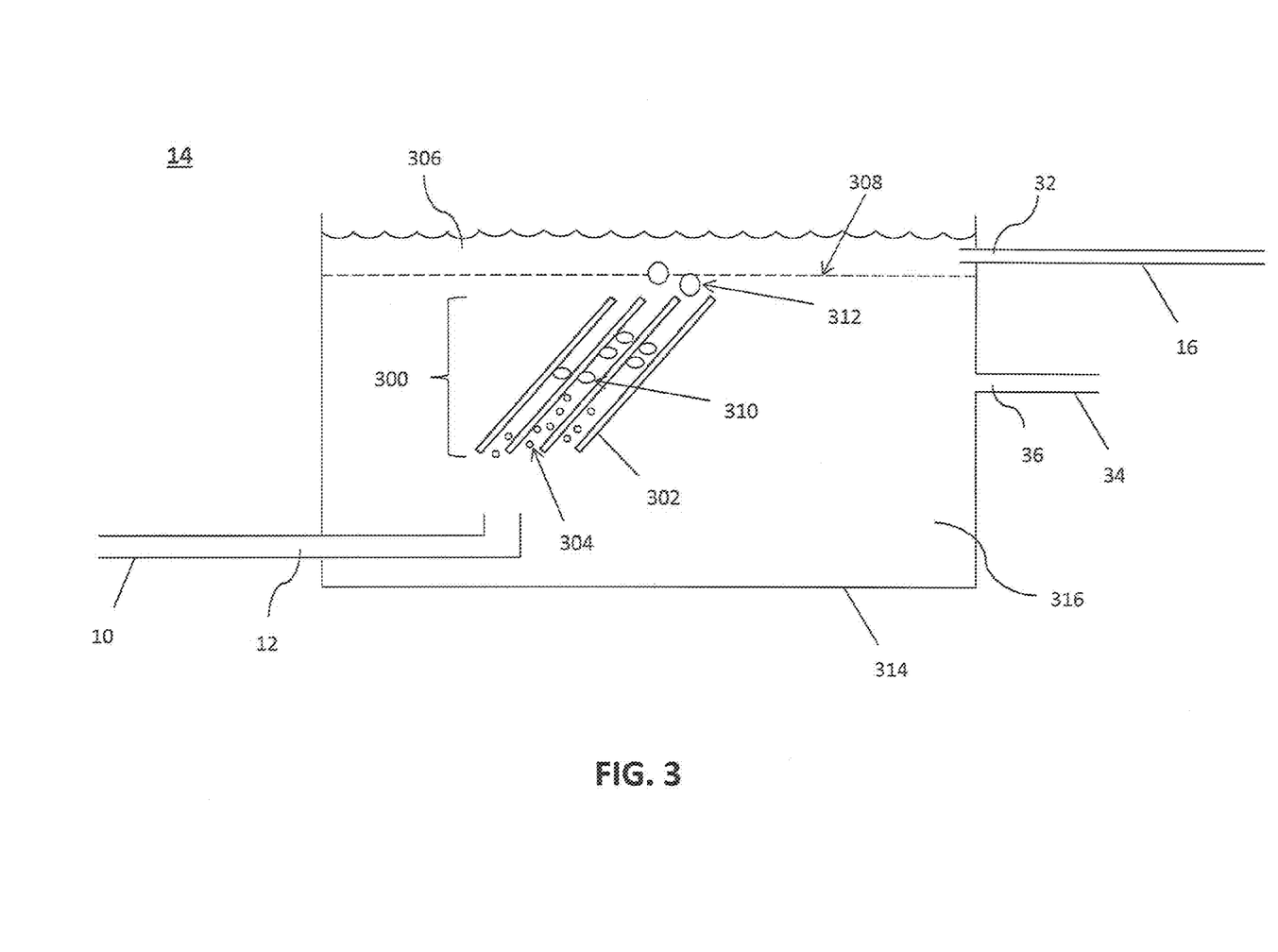
FIG. 3 is a cross section illustration of an exemplary coalescer.
Figure 4:
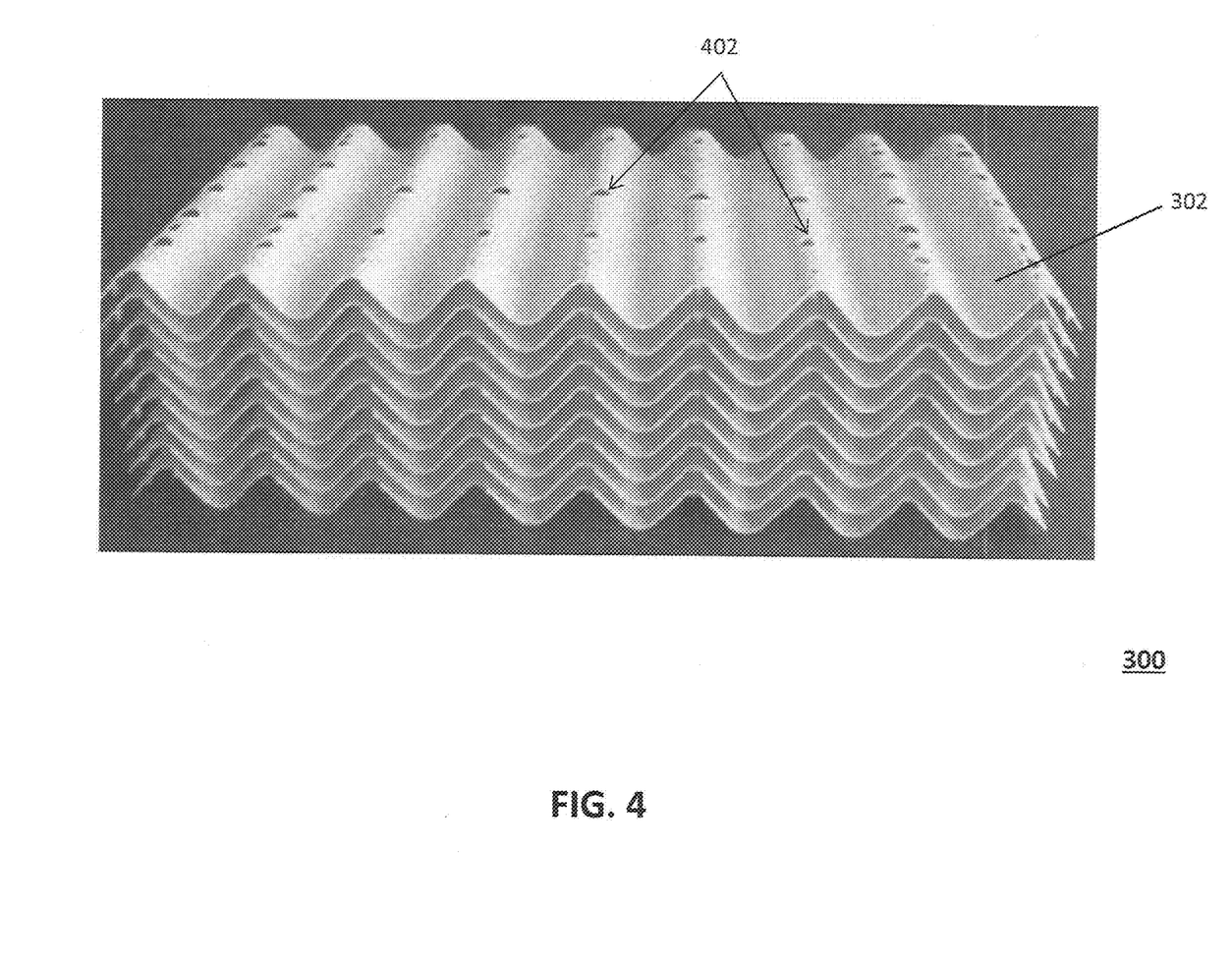
FIG. 4 is a perspective illustration of an exemplary parallel plate stack.

FIG. 3 provides a cross-sectional view of exemplary coalescer 14. In certain embodiments, coalescer 14 may serve as the primary separation unit. In other embodiments, as provided for in FIG. 1, coalescer 14 serves as a secondary separation unit for separating out estolide base oils from the immiscible components. A pre-separated (and/or pre-filtered) immiscible component stream, which may be derived from immiscible component layer 202, is shuttled into coalescer 14 though conduit 10 via inlet 12, and is directed towards parallel plate stack 300, including parallel plate 302. In operation, suspended estolide base oil droplets 304 derived from the immiscible component stream enters into parallel plate stack 300, which may comprise the sinusoidal structural design set forth in FIG. 4. Suspended estolide base oil droplets 304, having a lower density than the immiscible component(s), rise and contact the lower surface of the parallel plates, and are held by them due to the action of adhesion forces. As an increased number of base oil droplets 304 are captured, they coalesce into larger drops 310 and, which ultimately form a film. Under the effect of the kinetic head of the liquid, the film migrates over the surface of the plates to the orifices 402 for oil release, and passes to the above-lying estolide base oil layer 306 via coalesced bodies 312. Formation of the above-lying estolide base oil layer 306 creates interface 308 with immiscible component layer 316 in coalescer housing 314. Estolide base oil layer can be optionally shuttled to accumulator 26 through conduit 16 and inlet 24 via outlet 32, or transported to some other location for use, destruction, or storage. This may also be accomplished at a later period of time by expulsion through conduit 30 via outlet 38. Immiscible component layer 316 can be shuttled though conduit 34 via outlet 36 to be recycled, reused, or disposed of (e.g., return of purified bilge water to ocean).

In certain embodiments, the systems described herein may use, or further include, alternative separation techniques. Such techniques may include evaporation, centrifugation, adsorption/adsorption, filtration, electrochemical separation, bioremediation, and/or microorganism transformation.

In certain embodiments, the composition comprises and estolide base oil. In certain embodiments, the composition comprises oily bilge water that may be found in ocean-going vessels implementing the use of marine lubricants comprising estolides. In certain embodiments, the composition comprises an industrial waste stream, such as effluent derived from industrial manufacturing facilities. Exemplary waste streams may also include used motor oil collected from automobiles, which may undergo recycling steps that comprise de-watering. Thus, the composition may comprise one or more additional components, such as such as additives (e.g., antioxidants and antiwear agents), synthetic base oils (e.g., polyalphaolefins; polyakylene glycols), esters (e.g., triglycerides), and petroleum/hydrocarbon base stocks (e.g., Group I, II, or III base oils).

Thus, in certain embodiments the composition may undergo further processing. In certain embodiments, the composition further comprises at least one additional component. In certain embodiments, the at least one additional component comprises a hydrocarbon. In certain embodiments, the further processing comprises removing the at least one additional component from the composition. In certain embodiments, the removing comprises at least one of distilling or solvent extracting.

In certain embodiments, the estolide base oil comprises at least one estolide compound selected from compounds of Formula I:

Formula I wherein
x is, independently for each occurrence, an integer selected from 0, 1, 2, 3, 4, 5, 6, 7, 8, 9, 10, 11, 12, 13, 14, 15, 16, 17, 18, 19, and 20;
y is, independently for each occurrence, an integer selected from 0, 1, 2, 3, 4, 5, 6, 7, 8, 9, 10, 11, 12, 13, 14, 15, 16, 17, 18, 19, and 20;
n is equal to or greater than 0;
$R_1$ is an optionally substituted alkyl that is saturated or unsaturated, and branched or unbranched; and
$R_2$ is selected from hydrogen and optionally substituted alkyl that is saturated or unsaturated, and branched or unbranched;
wherein each fatty acid chain residue of said at least one compound is independently optionally substituted.

In certain embodiments, the estolide base oil comprises at least one estolide compound selected from compounds of Formula II:

Formula II wherein
n is an integer equal to or greater than 0;
$R_1$ is an optionally substituted alkyl that is saturated or unsaturated, and branched or unbranched; and
$R_2$ is selected from hydrogen and optionally substituted alkyl that is saturated or unsaturated, and branched or unbranched; and
$R_3$ and $R_4$, independently for each occurrence, are selected from optionally substituted alkyl that is saturated or unsaturated, and branched or unbranched.

In certain embodiments, the composition comprises at least one estolide of Formula I or II where $R_1$ is hydrogen.

The terms "chain" or "fatty acid chain" or "fatty acid chain residue," as used with respect to the estolide compounds of Formula I and II, refer to one or more of the fatty acid residues incorporated in estolide compounds, e.g., $R_3$ or $R_4$ of Formula II, or the structures represented by $CH_3(CH_2)_y CH(CH_2)_x$—C(O)O— in Formula I.

The $R_1$ in Formula I and II at the top of each Formula shown is an example of what may be referred to as a "cap"

or "capping material," as it "caps" the top of the estolide. Similarly, the capping group may be an organic acid residue of general formula —OC(O)-alkyl, i.e., a carboxylic acid with a substituted or unsubstituted, saturated or unsaturated, and/or branched or unbranched alkyl as defined herein, or a formic acid residue. In certain embodiments, the "cap" or "capping group" is a fatty acid. In certain embodiments, the capping group, regardless of size, is substituted or unsubstituted, saturated or unsaturated, and/or branched or unbranched. The cap or capping material may also be referred to as the primary or alpha ($\alpha$) chain. The $R_4C(O)O$— of Formula II or structure $CH_3(CH_2)_yCH(CH_2)_xC(O)O$— of Formula I serve as the "base" or "base chain residue" of the estolide. The base or base chain residue may also be referred to as tertiary or gamma ($\gamma$) chains.

The $R_3C(O)O$— of Formula II or structure $CH_3(CH_2)_yCH(CH_2)_x$—C(O)O— of Formula I are linking residues that link the capping material and the base fatty-acid residue together. There may be any number of linking residues in the estolide, including when n=0 and the estolide is in its dimer form. Depending on the manner in which the estolide is prepared, a linking residue may be a fatty acid and may initially be in an unsaturated form during synthesis. In some embodiments, the estolide will be formed when a catalyst is used to produce a carbocation at the fatty acid's site of unsaturation, which is followed by nucleophilic attack on the carbocation by the carboxylic group of another fatty acid. In some embodiments, it may be desirable to have a linking fatty acid that is monounsaturated so that when the fatty acids link together, all of the sites of unsaturation are eliminated. The linking residue(s) may also be referred to as secondary or beta ($\beta$) chains.

In certain embodiments, the cap is an acetyl group, the linking residue(s) is one or more fatty acid residues, and the base chain residue is a fatty acid residue. In certain embodiments, the linking residues present in an estolide differ from one another. In certain embodiments, one or more of the linking residues differs from the base chain residue.

Estolides may be prepared according to any method known to those of skill in the art. As noted above, in certain embodiments, unsaturated fatty acids such as mono- and/or polyunsaturated fatty acids may be used. For example, monounsaturated fatty acids, along with a suitable catalyst, will form a single carbocation that allows for the addition of a second fatty acid, whereby a single link between two fatty acids is formed. Suitable monounsaturated fatty acids may include, but are not limited to, palmitoleic acid (16:1), vaccenic acid (18:1), oleic acid (18:1), eicosenoic acid (20:1), erucic acid (22:1), and nervonic acid (24:1). In addition, in certain embodiments, polyunsaturated fatty acids may be used to create estolides. Suitable polyunsaturated fatty acids may include, but are not limited to, hexadecatrienoic acid (16:3), alpha-linolenic acid (18:3), stearidonic acid (18:4), eicosatrienoic acid (20:3), eicosatetraenoic acid (20:4), eicosapentaenoic acid (20:5), heneicosapentaenoic acid (21:5), docosapentaenoic acid (22:5), docosahexaenoic acid (22:6), tetracosapentaenoic acid (24:5), tetracosahexaenoic acid (24:6), linoleic acid (18:2), gamma-linoleic acid (18:3), eicosadienoic acid (20:2), dihomo-gamma-linolenic acid (20:3), arachidonic acid (20:4), docosadienoic acid (20:2), adrenic acid (22:4), docosapentaenoic acid (22:5), tetracosatetraenoic acid (22:4), tetracosapentaenoic acid (24:5), pinolenic acid (18:3), podocarpic acid (20:3), rumenic acid (18:2), alpha-calendic acid (18:3), beta-calendic acid (18:3), jacaric acid (18:3), alpha-eleostearic acid (18:3), beta-eleostearic (18:3), catalpic acid (18:3), punicic acid (18:3), rumelenic acid (18:3), alpha-parinaric acid (18:4), beta-parinaric acid (18:4), and bosseopentaenoic acid (20:5). Other exemplary fatty acids may include terminally-unsaturated fatty acids such as 10-undecenoic acid, which may be derived from castor oil. In certain embodiments, hydroxy fatty acids may be polymerized or homopolymerized by reacting the carboxylic acid functionality of one fatty acid with the hydroxy functionality of a second fatty acid. Exemplary hydroxyl fatty acids include, but are not limited to, ricinoleic acid, 6-hydroxystearic acid, 9,10-dihydroxystearic acid, 12-hydroxystearic acid, and 14-hydroxystearic acid.

The process for preparing the estolide compounds described herein may include the use of any natural or synthetic carboxylic acid source. However, it may be desirable to source the carboxylic acids from a renewable biological feedstock. Suitable starting materials of biological origin may include plant fats, plant oils, plant waxes, animal fats, animal oils, animal waxes, fish fats, fish oils, fish waxes, algal oils and mixtures thereof. Other potential carboxylic acid sources may include waste and recycled food-grade fats and oils, fats, oils, and waxes obtained by genetic engineering, fossil fuel-based materials and other sources of the materials desired.

In certain embodiments, the estolide compounds described herein may be prepared from non-naturally occurring fatty acids derived from naturally occurring feedstocks. In certain embodiments, the estolides are prepared from synthetic fatty acid reactants derived from naturally occurring feedstocks such as vegetable oils. For example, the synthetic fatty acid reactants may be prepared by cleaving fragments from larger fatty acid residues occurring in natural oils such as triglycerides using, for example, a cross-metathesis catalyst and alpha-olefin(s). The resulting truncated fatty acid residue(s) may be liberated from the glycerine backbone using any suitable hydrolytic and/or transesterification processes known to those of skill in the art. An exemplary fatty acid reactants include 9-dodecenoic acid and 9-decenoic acid, which may be prepared via the cross metathesis of an oleic acid residue with 1-butene.

In some embodiments, the estolide comprises fatty-acid chains of varying lengths. In some embodiments, x is, independently for each occurrence, an integer selected from 0 to 20, 0 to 18, 0 to 16, 0 to 14, 1 to 12, 1 to 10, 2 to 8, 6 to 8, or 4 to 6. In some embodiments, x is, independently for each occurrence, an integer selected from 7 and 8. In some embodiments, x is, independently for each occurrence, an integer selected from 0, 1, 2, 3, 4, 5, 6, 7, 8, 9, 10, 11, 12, 13, 14, 15, 16, 17, 18, 19, and 20. In certain embodiments, for at least one fatty acid chain residue, x is an integer selected from 7 and 8.

In some embodiments, y is, independently for each occurrence, an integer selected from 0 to 20, 0 to 18, 0 to 16, 0 to 14, 1 to 12, 1 to 10, 2 to 8, 6 to 8, or 4 to 6. In some embodiments, y is, independently for each occurrence, an integer selected from 7 and 8. In some embodiments, y is, independently for each occurrence, an integer selected from 0, 1, 2, 3, 4, 5, 6, 7, 8, 9, 10, 11, 12, 13, 14, 15, 16, 17, 18, 19, and 20. In some embodiments, for at least one fatty acid chain residue, y is an integer selected from 0 to 6, or 1 and 2. In certain embodiments, y is, independently for each occurrence, an integer selected from 1 to 6, or 1 and 2. In certain embodiments, y is 0.

In some embodiments, x+y is, independently for each chain, an integer selected from 0 to 40, 0 to 20, 10 to 20, or 12 to 18. In some embodiments, x+y is, independently for each chain, an integer selected from 13 to 15. In some embodiments, x+y is 15 for each chain. In some embodiments, x+y is, independently for each chain, an integer selected from 6, 7, 8, 9, 10, 11, 12, 13, 14, 15, 16, 17, 18, 19, 20, 21, 22, 23, and 24. In certain embodiments, for at least one fatty acid chain residue, x+y is an integer selected from 9 to 13. In certain embodiments, for at least one fatty acid chain residue, x+y is 9. In certain embodiments, x+y is, independently for each chain, an integer selected from 9 to 13. In certain embodiments, x+y is 9 for each fatty acid chain residue. In certain embodiments, x is 7 and y is 0, wherein x+y is 7.

In some embodiments, the estolide compound of Formula I or II may comprise any number of fatty acid residues to form an "n-mer" estolide. For example, the estolide may be in its dimer (n=0), trimer (n=1), tetramer (n=2), pentamer (n=3), hexamer (n=4), heptamer (n=5), octamer (n=6), nonamer (n=7), or decamer (n=8) form. In some embodiments, n is an integer selected from 0 to 20, 0 to 18, 0 to 16, 0 to 14, 0 to 12, 0 to 10, 0 to 8, or 0 to 6. In some embodiments, n is an integer selected from 0 to 4. In some embodiments, n is 1, wherein said at least one compound of Formula I or II comprises the trimer. In some embodiments, n is greater than 1. In some embodiments, n is an integer selected from 0, 1, 2, 3, 4, 5, 6, 7, 8, 9, 10, 11, 12, 13, 14, 15, 16, 17, 18, 19, and 20.

In certain embodiments, the estolide compounds and compositions described herein exhibit high- and ultra-high viscosities. In certain embodiments, such high- and ultra-high viscosity properties may be attributable to the size of the estolide oligomer, i.e., the estolide number (EN) of the estolide and the value of "n" with regard to Formula I and II. Thus, in certain embodiments, n is an integer selected from 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40. In certain embodiments, n is an integer selected from 10 to 30, 15 to 30, 20 to 30, or 15 to 25.

In some embodiments, $R_1$ of Formula I or II is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_1$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_1$ is selected from $C_{13}$ to $C_{17}$ alkyl, such as from $C_{13}$ alkyl, $C_{15}$ alkyl, and $C_{17}$ alkyl. In some embodiments, $R_1$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_2$ of Formula I or II is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_2$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_2$ is selected from $C_{13}$ to $C_{17}$ alkyl, such as from $C_{13}$ alkyl, $C_{15}$ alkyl, and $C_{17}$ alkyl. In some embodiments, $R_2$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_3$ is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_3$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_3$ is selected from $C_{13}$ to $C_{17}$ alkyl, such as from $C_{13}$ alkyl, $C_{15}$ alkyl, and $C_{17}$ alkyl. In some embodiments, $R_3$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_4$ is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_4$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_4$ is selected from $C_{13}$ to $C_{17}$ alkyl, such as from $C_{13}$ alkyl, $C_{15}$ alkyl, and $C_{17}$ alkyl. In some embodiments, $R_4$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, the estolide is in its free-acid form, wherein $R_2$ of Formula I or II is hydrogen. In some embodiments, $R_2$ is selected from optionally substituted alkyl that is saturated or unsaturated, and branched or unbranched. In certain embodiments, the $R_2$ residue may comprise any desired alkyl group, such as those derived from esterification of the estolide with the alcohols identified in the examples herein. In some embodiments, the alkyl group is selected from $C_1$ to $C_{40}$, $C_1$ to $C_{22}$, $C_3$ to $C_{20}$, $C_1$ to $C_{18}$, or $C_6$ to $C_{12}$ alkyl. In some embodiments, $R_2$ may be selected from $C_3$ alkyl, $C_4$ alkyl, $C_8$ alkyl, $C_{12}$ alkyl, $C_{16}$ alkyl, $C_{18}$ alkyl, and $C_{20}$ alkyl. For example, in certain embodiments, $R_2$ may be branched, such as isopropyl, isobutyl, or 2-ethylhexyl. In some embodiments, $R_2$ may be a larger alkyl group, branched or unbranched, comprising $C_{12}$ alkyl, $C_{16}$ alkyl, $C_{18}$ alkyl, or $C_{20}$ alkyl.

In some embodiments, the compounds described herein may comprise a mixture of two or more estolide compounds of Formula I and II. It is possible to characterize the chemical makeup of an estolide, a mixture of estolides, or a composition comprising estolides, by using the compound's, mixture's, or composition's measured estolide number (EN) of compound or composition. The EN represents the average number of fatty acids added to the base fatty acid. The EN also represents the average number of estolide linkages per molecule:

$$EN=n+1$$

wherein n is the number of secondary (β) fatty acids. Accordingly, a single estolide compound will have an EN that is a whole number, for example for dimers, trimers, and tetramers:

dimer $EN=1$ trimer $EN=2$ tetramer $EN=3$

However, a composition comprising two or more estolide compounds may have an EN that is a whole number or a fraction of a whole number. For example, a composition having a 1:1 molar ratio of dimer and trimer would have an EN of 1.5, while a composition having a 1:1 molar ratio of tetramer and trimer would have an EN of 2.5.

In some embodiments, the compositions may comprise a mixture of two or more estolides having an EN that is an integer or fraction of an integer that is greater than 4.5, or even 5.0. In some embodiments, the EN may be an integer or fraction of an integer selected from about 1.0 to about 5.0. In some embodiments, the EN is an integer or fraction of an integer selected from 1.2 to about 4.5. In some embodiments, the EN is selected from a value greater than 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6 and 5.8. In some embodiments, the EN is selected from a value less than 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, and 5.0, 5.2, 5.4, 5.6, 5.8, and 6.0. In some embodiments, the EN is selected from 1, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, and 6.0. In certain embodiments, the EN is at least 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40. In certain embodiments, the EN is about 10 to about 30. In certain embodiments, the EN is about 15 to about 30. In certain embodiments, the EN is about 20 to about 40. In certain embodiments, the EN is about 20 to about 30. In certain embodiments, the EN is about 15 to about 25.

As noted above, it should be understood that the chains of the estolide compounds may be independently optionally substituted, wherein one or more hydrogens are removed and replaced with one or more of the substituents identified herein. Similarly, two or more of the hydrogen residues may be removed to provide one or more sites of unsaturation, such as a cis or trans double bond. Further, the chains may optionally comprise branched hydrocarbon residues. For example, in some embodiments the estolides described herein may comprise at least one compound of Formula II:

Formula II wherein n is an integer equal to or greater than 0;

$R_1$ is an optionally substituted alkyl that is saturated or unsaturated, and branched or unbranched $R_2$ is selected from hydrogen and optionally substituted alkyl that is saturated or unsaturated, and branched or unbranched; and $R_3$ and $R_4$, independently for each occurrence, are selected from optionally substituted alkyl that is saturated or unsaturated, and branched or unbranched.

In some embodiments, n is an integer selected from 1 to 20. In some embodiments, n is an integer selected from 1 to 12. In some embodiments, n is an integer selected from 1, 2, 3, 4, 5, 6, 7, 8, 9, 10, 11, 12, 13, 14, 15, 16, 17, 18, 19 and 20. In certain embodiments, n is an integer selected from 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40. In certain embodiments, n is an integer selected from 10 to 30, 15 to 30, 20 to 30, or 15 to 25. In some embodiments, one or more $R_3$ differs from one or more other $R_3$ in a compound of Formula II. In some embodiments, one or more $R_3$ differs from $R_4$ in a compound of Formula II. In some embodiments, if the compounds of Formula II are prepared from one or more polyunsaturated fatty acids, it is possible that one or more of $R_3$ and $R_4$ will have one or more sites of unsaturation. In some embodiments, if the compounds of Formula II are prepared from one or more branched fatty acids, it is possible that one or more of $R_3$ and $R_4$ will be branched.

In some embodiments, $R_3$ and $R_4$ can be $CH_3(CH_2)_y CH(CH_2)_x-$, where x is, independently for each occurrence, an integer selected from 0, 1, 2, 3, 4, 5, 6, 7, 8, 9, 10, 11, 12, 13, 14, 15, 16, 17, 18, 19, and 20, and y is, independently for each occurrence, an integer selected from 0, 1, 2, 3, 4, 5, 6, 7, 8, 9, 10, 11, 12, 13, 14, 15, 16, 17, 18, 19, and 20. Where both $R_3$ and $R_4$ are $CH_3(CH_2)_y CH(CH_2)_x-$, the compounds may be compounds according to Formula I.

Methods of reclaiming, recycling, and reusing estolide-containing compositions described herein will be apparent to those of ordinary skill in the art, with exemplary procedures being described below.

EXAMPLES

Example 1

Figure 5:
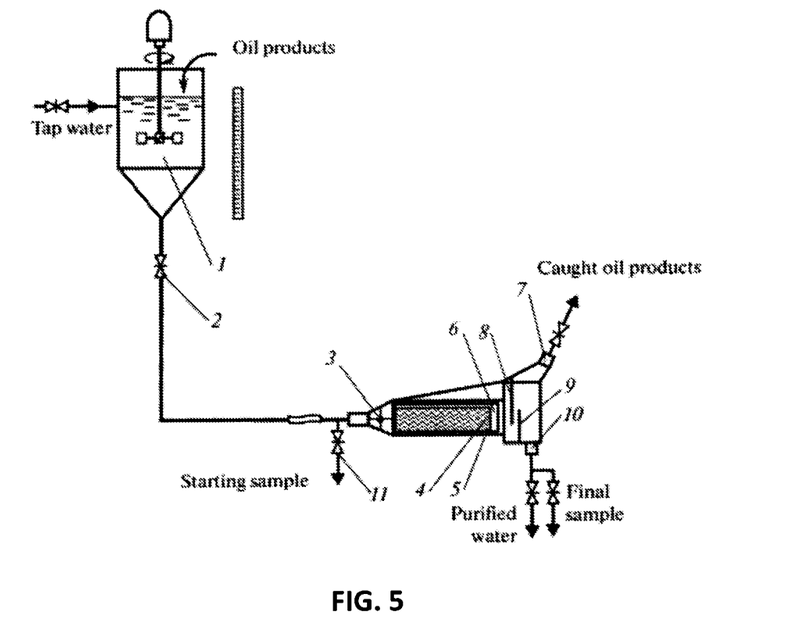
FIG. 5 is a schematic drawing of coalescing laboratory installation.

To verify the possibility of the removal of emulsified estolide base oil products from water by coalescence on sinusoidal polypropylene plates, a laboratory installation is developed having the schematic diagram set forth in FIG. 5. The experimental apparatus for the investigation of the removal of estolide base oil products from waste waters by coalescence on polypropylene plates is equipped with a discharge vessel with a stirrer, shutoff and regulating accessories, and connecting hoses. The apparatus is then sealed and mounted on a laboratory stand. Testing shall confirm that the hydrodynamic coalescence on the plates from the oleophilic material allows for the separation of all estolide oil drops from water, such as those larger than about 20 μm. Therefore, to perform the experiments, it will be necessary to form an estolide base oil emulsion in water containing drops with approximately this average size.

The emulsion is prepared via mechanically dispersing an estolide ebase oil in tap water using a blender mixer with a power of 600 W. Preliminary calculations show that to obtain the average size of oil drops of 20 μm, the dissipation rate of the power in the volume unit of the emulsion of about $MW/m^3$ is desired. This dissipation rate of the power can be obtained via dispersing the power by the blender mixer in a volume of 0.2 liters. The portion of the noted volume of the thoroughly prepared, finely dispersed oil emulsion in water is poured into discharge vessel 1 and stirred with tap water for no less than 3 min using a turbine stirrer rotating with a rate of about 50 rpm.

With reference to FIG. 5, by opening valve 2, the emulsion is flowed into the distributive facility 3 and then into the package of corrugated plates 4. The gap between the plates is 6 mm, the number of channels is 12, and the number of plates is 13. The package of the plates is placed into rectangular vessel 5 with viewing windows 6 made from plexiglass on the front and back walls. To prevent the breakthrough of the caught oil products into the purified water, oil-holding partition 8 is fastened on vessel cap 5. Purified water is passed through system of labyrinth partitions 9 and is discharged from the apparatus through connecting pipe 10.

Prior to commencing the experiment, emulsions with the specified oil content in water (from 100 to 1000 mg/l) are prepared in vessel 1. Then, valve 2 is opened and the starting emulsion is flowed into distributive facility 3 and then into the package of corrugated plates 4. Water consumption through the installation is controlled by a valve mounted at the outlet from vessel 5 and measured by the rate of lowering the level of the starting emulsion in vessel 1 using a level gauge (water-gauge glass) and a stopwatch. During the course of the experiment, a sample of the starting emulsion is taken for analysis through sampler H. The specimen of the purified water is sampled at the outlet from the installation through the sampler.

The experiments are performed at various estolide base oil concentrations in water (approximately 100, 500, and 1000 mg/l). In the first series of experiments, the emulsion velocity in the channels is 0.006 m/s (the volume discharge through the block of plates is 7.8 l/min). Qualitative analysis of the samples should demonstrate that a high volume of estolide base oil is removed from the emulsion, and that the polypropylene plates provide ample oleophilic properties for the removal of estolides from water.

The invention claimed is:

1. A method comprising:
    providing a first composition comprising an estolide base oil, at least one additional component, and at least one immiscible component;
    separating the at least one immiscible component from the first composition to provide a second composition comprising the at least one additional component and the estolide base oil; and
    removing the at least one additional component from the second composition.

2. The method according to claim 1, wherein the at least one immiscible component comprises water.

3. The method according to claim 2, wherein the composition comprises an emulsion.

4. The method according to claim 1, wherein the separating comprises at least one of gravity separating, coalescing, or accumulating.

5. The method according to claim 1, wherein the separating comprises the use of at least one coalescer.

6. The method according to claim 5, wherein the at least one coalescer comprises one or more corrugated plates.

7. The method according to claim 5, wherein the at least one coalescer comprises an oleophilic material.

8. The method according to claim 7, wherein the oleophilic material comprises a polymer.

9. The method according to claim 8, wherein the oleophilic material comprises a polyolefin.

10. The method according to claim 1, wherein the separating comprises the use of an accumulator.

11. The method according claim 1, wherein the separating comprises the use of filtration.

12. The method according to claim 1, wherein the separating comprises the use of adsorption/absorption.

13. The method according to any one claim 1, wherein the first composition comprises marine bilge water.

14. The method according to claim 1, wherein the at least one additional component comprises a hydrocarbon.

15. The method according to claim 1, wherein the removing comprises at least one of distilling or solvent extracting.

16. The method according to claim 1, wherein the second composition is reused or recycled.

17. The method according to claim 14, wherein the at least one additional component is selected from one or more of a Group I base oil, a Group II base oil, or a Group III base oil.

18. The method according to claim 1, wherein the estolide base oil comprises at least one compound selected from Formula I:

Formula I wherein
    x is, independently for each occurrence, an integer selected from 0 to 20;
    y is, independently for each occurrence, an integer selected from 0 to 20;
    n is an integer greater than or equal to 0;
    $R_1$ is selected from hydrogen and optionally substituted alkyl that is saturated or unsaturated, and branched or unbranched; and
    $R_2$ is selected from hydrogen and an optionally substituted alkyl that is saturated or unsaturated, and branched or unbranched,
        wherein each fatty acid chain residue of said at least one estolide compound is independently optionally substituted.

19. The method according to claim 18, wherein
    x is, independently for each occurrence, an integer selected from 0 to 14;
    y is, independently for each occurrence, an integer selected from 0 to 14;
    n is an integer selected from 0 to 50;
    $R_1$ is an optionally substituted $C_1$ to $C_{22}$ alkyl that is saturated or unsaturated, and branched or unbranched; and
    $R_2$ is an optionally substituted $C_1$ to $C_{22}$ alkyl that is saturated or unsaturated, and branched or unbranched,
        wherein each fatty acid chain residue is unsubstituted.

* * * * *